(12) United States Patent
Singh et al.

(10) Patent No.: US 8,169,995 B2
(45) Date of Patent: May 1, 2012

(54) SYSTEM AND METHOD FOR WIRELESS COMMUNICATION OF UNCOMPRESSED VIDEO HAVING DELAY-INSENSITIVE DATA TRANSFER

(75) Inventors: Harkirat Singh, Santa Clara, CA (US);
Huai-Rong Shao, San Jose, CA (US);
Xiangping Qin, San Jose, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 858 days.

(21) Appl. No.: 11/868,325

(22) Filed: Oct. 5, 2007

(65) Prior Publication Data
US 2008/0130617 A1 Jun. 5, 2008

Related U.S. Application Data

(60) Provisional application No. 60/872,948, filed on Dec. 4, 2006.

(51) Int. Cl.
*H04J 3/24* (2006.01)
(52) U.S. Cl. .......................... 370/349; 370/473; 370/493
(58) Field of Classification Search .......................... None
See application file for complete search history.

(56) References Cited

U.S. PATENT DOCUMENTS

| | | | |
|---|---|---|---|
| 6,771,660 B1 | 8/2004 | Bourlas et al. | |
| 6,775,804 B1 * | 8/2004 | Dawson | 714/776 |
| 6,782,503 B1 * | 8/2004 | Dawson | 714/739 |
| 6,891,832 B1 * | 5/2005 | Chien et al. | 370/395.1 |
| 6,934,768 B1 * | 8/2005 | Block et al. | 709/248 |
| 6,999,088 B1 | 2/2006 | Van Dyke et al. | |
| 7,164,695 B2 * | 1/2007 | Sugaya et al. | 370/474 |
| 7,257,095 B2 * | 8/2007 | Liu | 370/311 |
| 7,292,530 B2 * | 11/2007 | Christensen | 370/230.1 |

(Continued)

FOREIGN PATENT DOCUMENTS

KR 1020020040897 A 5/2002

(Continued)

OTHER PUBLICATIONS

FreshNews.com, SiBEAM Receives Equity Investment from Best Buy, http://freshnews.com/print/node/261440, Jan. 4, 2010, 2 pages.

(Continued)

*Primary Examiner* — Gregory Sefcheck
(74) *Attorney, Agent, or Firm* — Kenneth L. Sherman, Esq.; Michael Zarrabian, Esq.; Sherman & Zarrabian LLP

(57) ABSTRACT

A system and method using a medium access control (MAC) header for a wireless communication system including an application layer, a MAC layer, and a physical (PHY) layer is disclosed. The MAC header accommodates time-delay insensitive data transfer between devices located in the network. The MAC header finds particular benefits in short range networks that transfer high definition (HD) video between components. One embodiment of the invention comprises a method of transferring data in a wireless communication network for uncompressed video including fragmenting the data into a plurality of data packets; appending a PHY header to at least one of the data packets to form a MAC frame; setting a field in the PHY header to indicate that the packets do not contain audio video (A/V) data; and transmitting the MAC frame to another device in the wireless communication network.

29 Claims, 11 Drawing Sheets

U.S. PATENT DOCUMENTS

| | | | |
|---|---|---|---|
| 7,333,665 B2 | 2/2008 | Orr | |
| 7,436,776 B2 * | 10/2008 | Koga | 370/246 |
| 7,519,030 B2 * | 4/2009 | Cimini et al. | 370/338 |
| 7,529,855 B2 * | 5/2009 | Block et al. | 709/248 |
| 7,535,930 B2 * | 5/2009 | Lim et al. | 370/474 |
| 7,630,403 B2 * | 12/2009 | Ho et al. | 370/473 |
| 7,633,970 B2 | 12/2009 | van Kampen et al. | |
| 7,653,844 B2 * | 1/2010 | Sasaki | 714/716 |
| 7,746,842 B2 * | 6/2010 | Sugaya | 370/349 |
| 7,894,413 B1 * | 2/2011 | Cimini et al. | 370/338 |
| 2002/0150040 A1 | 10/2002 | Tong et al. | |
| 2004/0004945 A1 | 1/2004 | Monsen | |
| 2004/0162083 A1 | 8/2004 | Chen et al. | |
| 2004/0258092 A1 * | 12/2004 | Sugaya | 370/474 |
| 2004/0264497 A1 | 12/2004 | Wang et al. | |
| 2005/0053037 A1 * | 3/2005 | Ginzburg et al. | 370/333 |
| 2005/0094675 A1 | 5/2005 | Bushan et al. | |
| 2005/0190718 A1 | 9/2005 | Holtzman et al. | |
| 2005/0249183 A1 * | 11/2005 | Danon et al. | 370/347 |
| 2005/0265371 A1 * | 12/2005 | Sharma et al. | 370/428 |
| 2005/0268181 A1 * | 12/2005 | Murty et al. | 714/704 |
| 2005/0289631 A1 | 12/2005 | Shoemake | |
| 2006/0029099 A1 | 2/2006 | Jang et al. | |
| 2006/0045117 A1 * | 3/2006 | Qi et al. | 370/445 |
| 2006/0056443 A1 | 3/2006 | Tao et al. | |
| 2006/0092893 A1 | 5/2006 | Champion et al. | |
| 2007/0115847 A1 * | 5/2007 | Strutt et al. | 370/252 |
| 2007/0165674 A1 | 7/2007 | Oh et al. | |
| 2007/0189397 A1 | 8/2007 | Ngo et al. | |
| 2007/0211667 A1 | 9/2007 | Agrawal et al. | |
| 2007/0230461 A1 | 10/2007 | Singh et al. | |
| 2007/0248023 A1 * | 10/2007 | Chui | 370/252 |
| 2007/0286103 A1 | 12/2007 | Niu et al. | |
| 2007/0291853 A1 | 12/2007 | Kim et al. | |
| 2008/0025211 A1 | 1/2008 | Karaoguz et al. | |
| 2008/0192726 A1 | 8/2008 | Mahesh et al. | |
| 2008/0192776 A1 * | 8/2008 | Fleming et al. | 370/514 |
| 2008/0250294 A1 | 10/2008 | Ngo et al. | |

FOREIGN PATENT DOCUMENTS

| | | |
|---|---|---|
| KR | 100736102 B1 | 6/2007 |
| WO | WO 02/057877 A2 | 7/2002 |

OTHER PUBLICATIONS

Hachman, "CE Giants back Amimon's Wireless HDTV Tech," online: www.pcmag.com, 1 page, Jul. 23, 2008.

LG Electronics, et al., WirelessHD Specification Version 1.0 Overview, Oct. 9, 2007, pp. 1-77.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).

International Search Report dated Feb. 11, 2008 for PCT/KR2007/005545, filed Nov. 5, 2007.

International Preliminary Report on Patentability and Written Opinion dated May 12, 2009 for PCT/KR2007/005545, filed Nov. 5, 2007.

U.S. Office Action dated Sep. 16, 2009 in U.S. Appl. No. 11/784,368, filed Apr. 5, 2007.

Written Opinion and International Search Report dated Jul. 3, 2008 for related PCT Application No. PCT/KR2008/000798, filed on Feb. 12, 2008.

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf ], pp. 1-6, US.

U.S. Final Office Action dated Mar. 26, 2010 in U.S. Appl. No. 11/784,368, filed Apr. 5, 2007.

U.S. Non-Final Office Action dated Oct. 1, 2010 in U.S. Appl. No. 11/784,368, filed Apr. 5, 2007.

Korean Decision to Grant dated Aug. 18, 2010 issued in Korean Patent Application No. 10-2008-7017125, 2 pages, Korean Intellectual Property Office, Seo-gu, Daejeon, Republic of Korea (English-language translation, 2 p.).

Korean Office Action dated Mar. 19, 2010 issued in Korean Patent Application No. 10-2008-7017125, Korean Intellectual Property Office, 3 pages, Seo-gu, Daejeon, Republic of Korea [English-language translation, 3 p.].

Chinese Office Action dated Feb. 17, 2012 issued in Chinese Patent Application No. 200880109198, Chinese Patent Office, pp. 1-9, People's Republic of China (Machine-generated English-language translation, pp. 1-4).

* cited by examiner

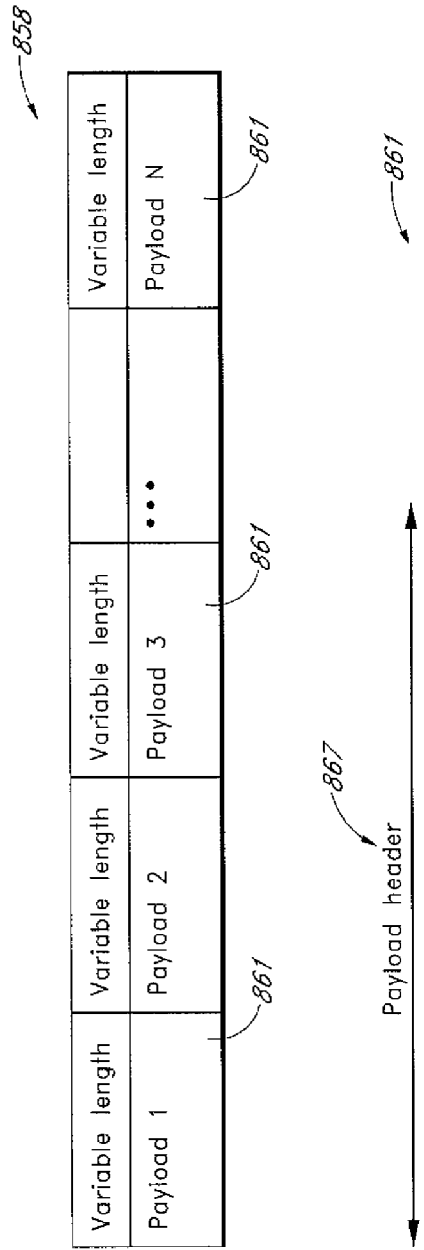

SYSTEM AND METHOD FOR WIRELESS COMMUNICATION OF UNCOMPRESSED VIDEO HAVING DELAY-INSENSITIVE DATA TRANSFER

RELATED APPLICATION

This application claims priority from U.S. Provisional Patent Application No. 60/872,948, filed on Dec. 4, 2006, which is incorporated herein by reference.

BACKGROUND

1. Field of the Invention

The invention relates to wireless transmission of data information, and in particular, to wireless transmission of delay insensitive uncompressed data over a wireless network.

2. Brief Description of the Related Technology

High definition (HD) television has been well received by consumers and now many HD components are available. The high-definition multimedia interface (HDMI) standard has been developed to allow compatible interfaces between components. The next stage is to allow consumers to connect HD components across a short range wireless network. To achieve real-time video transfer, the video is transmitted in uncompressed form.

Time insensitive data transfer such as file transfer is a very important application for high data rate wireless networks designed for downloading/uploading compressed/uncompressed video files or other data files over short ranges. Even though such applications are delay insensitive, an efficient transmission scheme can significantly enhance the channel efficiency. For battery operated devices, reduction in data transfer time results in a longer battery life.

A high-rate PHY (HRP) frame format has not been defined for such networks. A HRP composite frame format for uncompressed video is defined as illustrated in FIG. 1. However, there are several problems with using this format for other types of data transfer. First, some header information such as a field of clock sync information 102 and a field of video header 104 are not applicable to data transmission. Second, for transfer of composite packets, it is reasonable to set seven sub-packets 106, but the seven sub-packets 106 need to be mapped to five ACK groups to accommodate different types of payload information. However, for data transfer, since there are at most two types of payload (i.e., data and control) there is no need to set seven sub-packets 106 and then perform ACK group mapping. The delay insensitive data to transfer may include stored multimedia files. These days, there are many occasions in which such multimedia files need to be transferred from one device to another. For example, a digital camera or camcorder easily produces high-resolution pictures or a long video clip that the user may want to upload to a computer or an HDTV. The size of a multimedia file is usually much larger than the other types of files.

SUMMARY OF CERTAIN INVENTIVE ASPECTS

One aspect of the invention provides a method of transferring data in a wireless communication network for uncompressed video. The method includes: fragmenting the data into a plurality of data packets; appending a PHY header to at least one of the data packets to form a medium access control (MAC) frame; setting a field in the PHY header to indicate that the packets do not contain audio video (A/V) data; and transmitting the MAC frame to another device in the wireless communication network.

After the data has been transmitted, transmitting may packetize uncompressed video with the MAC frame and setting the field of the PHY header to indicate A/V data is being transferred.

The method may further include fragmenting at least one of the data packets into a predetermined number of sub-packets, wherein the predetermined number of sub-packets when the sub-packets do not contain A/V data is different from the number of the sub-packets when the A/V data is transferred. The predetermined number of sub-packets may be same as a number of acknowledgment (ACK) groups in the another device such that a PHY layer in the other device does not apply an acknowledgment group mapping for mapping the sup-packets to the ACK groups. Each ACK group may be appended by a cyclic redundancy checksum (CRC), wherein the CRC is handled by the PHY layer. All the sub-packets in an ACK group may be moved to a MAC layer in a receiver side by a PHY layer of the receiver side. The MAC layer may selectively select sub-packets whose own CRCs are correct.

The method may further include a retransmission indicator field configured to indicate the retransmission status of each sub-packet. The method may further include appending a MAC header to at least one of the data packets to form the MAC frame. Each of the sub-packets may include own MAC header such that errors in one MAC header do not affect other sub-packets. The sub-packets may share one MAC header.

The A/V data may include video, audio, and control. The MAC frame may include a MAC header, wherein the MAC frame further comprises a header CRC for the PHY header and the MAC header.

Each of the plurality of data packets may include a sub-packet, and wherein the sub-pack comprises a plurality of small payloads. Each of the small payloads may include a sub-sub-packet. Each of the small payloads may include a payload header comprising fields for length, sequence number, fragment control, CRC, and MSDU. Each of the small payloads may include a known pattern.

The PHY and MAC headers may be designed to fit into 3 orthogonal frequency division multiplexing (OFDM) symbols.

Another aspect of the invention provides a system for transferring data in a wireless communication network for uncompressed video. The system includes: a transmitter configured to receive data and generate a plurality of medium access control (MAC) frame according to a first format, the transmitter comprising a physical (PHY) layer and a MAC layer; and a receiver configured to receive the plurality of MAC frame from the transmitter and extract original data according to the first format, comprising a physical (PHY) layer and a medium access control (MAC) layer. The MAC frame comprises a field to indicate that data packets in the MAC frame do not contain audio video (A/V) data.

After the data has been transmitted, the MAC frame may contain uncompressed video and the field of the MAC frame is set to indicate A/V data is being transferred, and the transmitter and the receiver may use a second format of the MAC frame.

The transmitter may further include a detector configured to detect whether the data contains the A/V data and a controller to set the field of the MAC frame according to a signal from the detector.

Still another aspect of the invention provides a system for transferring data in a wireless communication network for uncompressed video. The system includes: a transmitter configured to receive data and generate a plurality of medium access control (MAC) frame according to a first format, the transmitter comprising a physical (PHY) layer and a MAC layer; and a receiver configured to receive the plurality of MAC frame from the transmitter and extract original data according to the first format, comprising a physical (PHY) layer and a medium access control (MAC) layer. The data packets in the MAC frame do not contain audio video (A/V) data.

Still another aspect of the invention provides a system for transferring data in a wireless communication network for uncompressed video. The system includes: means for fragmenting the data into a plurality of data packets; means for appending a PHY header to at least one of the data packets to form a medium access control (MAC) frame; means for setting a field in the PHY header to indicate that the packets do not contain audio video (A/V) data; and means for transmitting the MAC frame to another device in the wireless communication network.

BRIEF DESCRIPTION OF THE DRAWINGS

FIG. 8 is a diagram illustrating a sub-packet format;

FIG. 9 is a diagram illustrating a sub-packet payload format in FIG. 8;

FIG. 10 is a diagram illustrating a payload format in FIG. 9;

DETAILED DESCRIPTION OF CERTAIN INVENTIVE EMBODIMENTS

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Overview of Communication System

Certain embodiments provide a method and system for transmission of uncompressed HD video information from a transmitter to a receiver over wireless channels.

Figure 2:
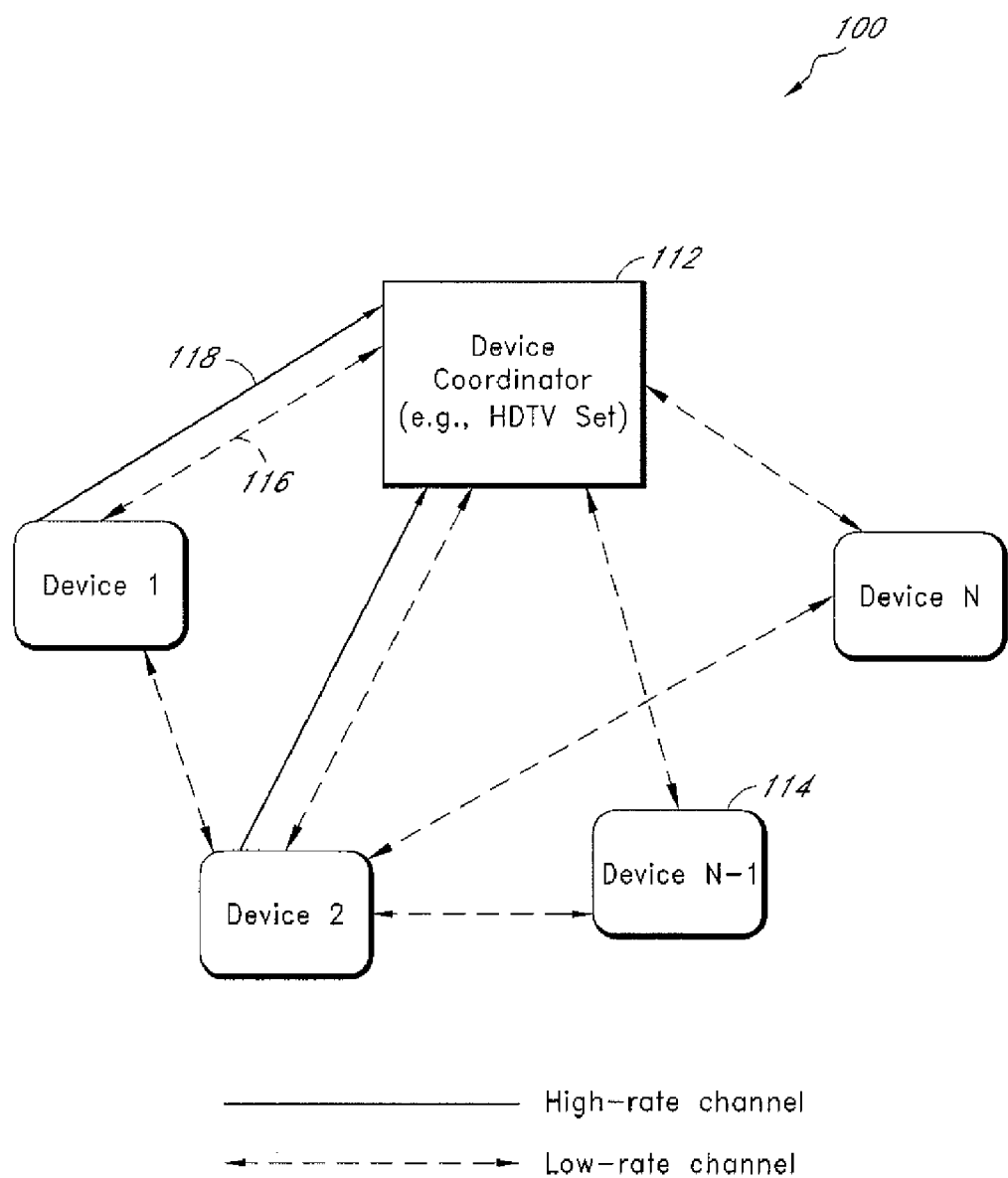
FIG. 2 is a functional block diagram of a wireless network that implements uncompressed HD video transmission between wireless devices according to one embodiment of the system and method.

A wireless video area network (WVAN) consists of one Coordinator and one or more Stations as shown in FIG. 2. The Coordinator is normally, but not always, a device that is a sink for audio or video data, e.g., a display, but also potentially a media storage device like a personal video recorder (PVR). A Station, on the other hand, is a device that has media that it can either source or sink, potentially at the same time with the time division duplex (TDD) scheme.

The computing and networking industry uses the Open Systems Interconnection Reference Model (OSI model) for communications and computer network protocol design. The OSI model is a hierarchical structure of seven layers that defines the requirements for communications between two devices. The seven layers include application layer, presentation layer, session layer, transport layer, network layer, data link layer, physical layer.

Of particular relevance here are the data link and physical layers. The data link layer provides the functional and procedural means to transfer data between network entities and to detect and possibly correct errors that may occur in the physical layer. The data link layer is divided into two sublayers: the Media Access Control (MAC) layer and the Logical Link Control (LLC) layer. The MAC sublayer controls how a computer on the network gains access to the data and permission to transmit it. The LLC layer controls frame synchronization, flow control and error checking. The physical (PHY) layer defines all the electrical and physical specifications for devices.

The high-rate PHY (HRP) is a PHY that supports multi-Gb/s throughput at distance of about 10 m through adaptive antenna technology. Because of this, the HRP is highly directional and can only be used for unicast connections as shown in FIG. 2. The HRP is optimized for the delivery of uncompressed high-definition video, and other data can be communicated using the HRP. To support multiple video resolutions, the HRP has more than one data rate defined. The HRP carries isochronous data such as audio and video, asynchronous data, MAC commands, antenna steering information, data, and higher layer control data for A/V devices. Alternatively, the HRP may carry all data isochronously.

The low-rate PHY (LRP) is a multi-Mb/s bidirectional link that also provides a range of about 10 m. Multiple data rates are defined for the LRP, with the lower data rates having near omni-directional coverage while the highest data rates are directional as shown in FIG. 2. Because the LRP has near omni-directional modes, it can be used for both unicast and broadcast connections. Furthermore, because all stations support the LRP, it can be used for station-to-station links. The LRP supports multiple data rates, including directional modes, and is used to carry low-rate isochronous data such as audio, low-rate asynchronous data, MAC commands including the beacon frame, acknowledgements for HRP packets, antenna steering information, capabilities information, and higher layer control data for A/V devices.

The HRP and LRP operate in overlapping frequency bands and so they are coordinated in a TDMA (time division multiple access) manner by the MAC. The WVAN supports at least one uncompressed 1080p video stream with associated audio at a time. Multiple lower rate uncompressed video streams, e.g., two 1080i video streams, are also supported.

The WVAN supports two types of devices, coordinator and station. The coordinator controls the timing in the WVAN, keeps track of the members of the WVAN, transmits or receives data using the LRP or using the HRP. The station transmits and receives data using the LRP, initiates stream connections, and transmits or receives data using the HRP. The station may be capable of acting as a coordinator in the WVAN. Such a station is referred to as being coordinator capable.

In addition to the two MAC personalities of coordinator and station, each device in the WVAN will have one of four different PHY capabilities; HR0, HRRX, HRTX, and HRTR. HR0 is a device that is not able to either receive or transmit using the HRP. HRRX is a device that is able to receive in the HRP, but is not able to transmit using the HRP. HRTX is a device that is able to transmit in the HRP, but is not able to receive using the HRP. HRTR is a device that is able to both transmit and receive using the HRP.

All compliant wireless devices are able to transmit and receive using the LRP. Both the HRP and LRP may provide multiple data rates.

Detailed Operation of the Wireless Communication Systems

Some embodiments in a wireless high definition (HD) audio video (A/V) system will now be described. The A/V system may also include an audiovisual system.

FIG. 2 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 2), and may use a high-rate (HR) channel 118 (heavy solid lines in FIG. 2), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a transmitter of the video information (hereinafter "transmitter 114"). For example, the receiver 112 can be a sink of video and/or audio data implemented, such as, in an HDTV set in a home wireless network environment which is a type of WLAN. The transmitter 114 can be a source of uncompressed video or audio. Examples of the transmitter 114 include a set-top box, a DVD player or recorder, digital camera, camcorder, and so forth.

Figure 3:
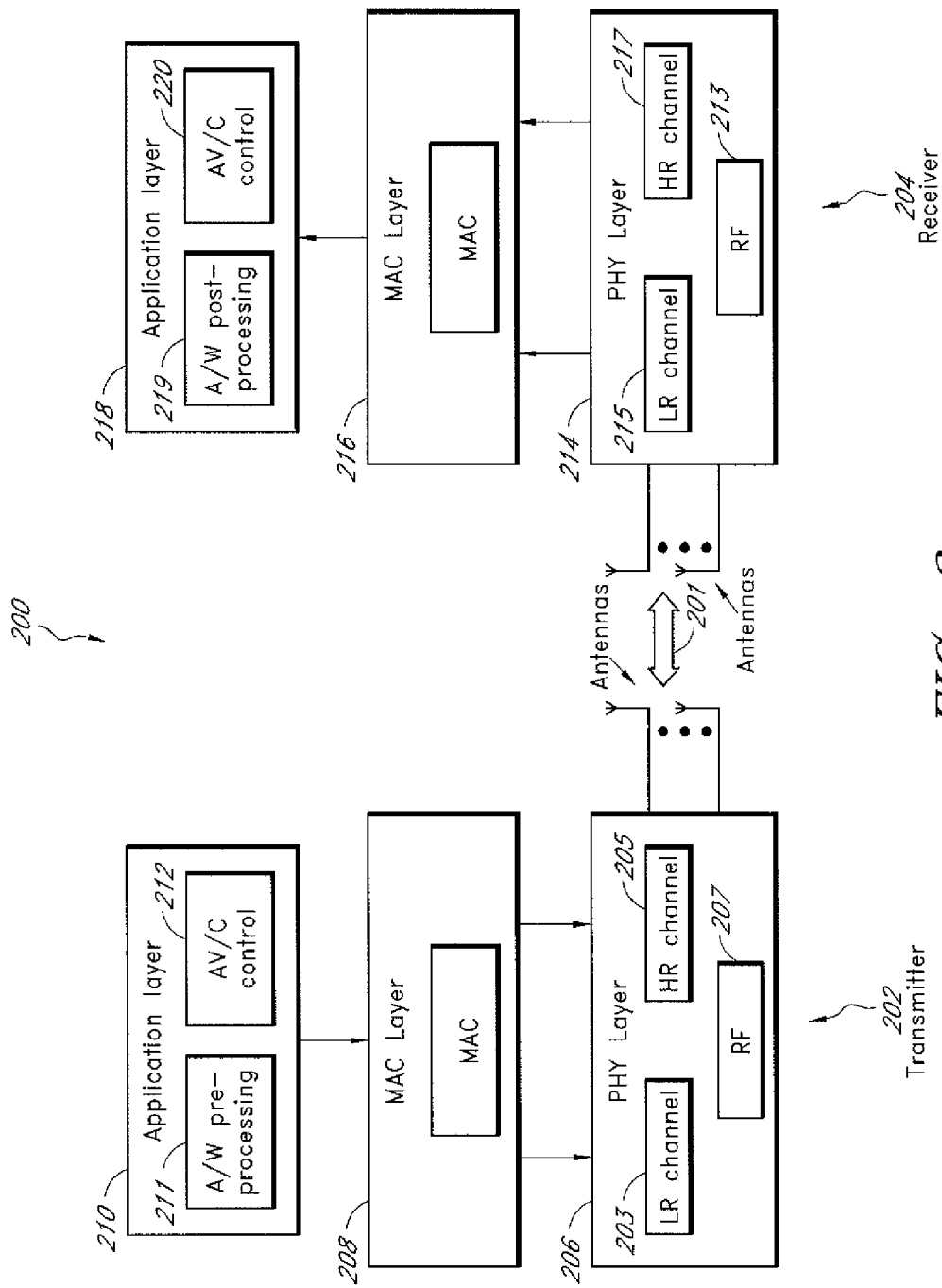
FIG. 3 is a functional block diagram of an exemplary communication system for transmission of uncompressed HD video over a wireless medium, according to one embodiment of the system and method.

FIG. 3 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection ended, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse of the processing method of the module 211 to regenerate the uncompressed video, for example. The AV/C module 220 operates in a complementary way with the AV/C module 212 of the transmitter 202.

Cyclic Redundancy Checksum

A cyclic redundancy checksum (CRC) is a value which is computed from a block of data, such as a packet of data communicated via network communication. The checksum is used to detect errors after transmission. A CRC is computed and appended to the packet of data before transmission, and verified afterwards by the recipient to confirm that no changes occurred during the transmission.

In the wireless communication system having a transmitter and a receiver, the transmitter computes a cyclic redundancy checksum for a data packet which is being sent to the receiver and appends the checksum to the data packet. The receiver, receiving the data packet and the checksum, computes its own cyclic redundancy checksum for the received data packet, and compares the computed checksum with the received checksum to determine whether contents of the data packet changed during the transmission.

The data packet includes a payload to transmit, a PHY header, and a MAC header. The CRC is attached to the MAC header as a part of the data packet. Usually, the MAC header is variable in its size. It is inefficient to compute a CRC for a data packet of a variable size.

An aspect of the invention is to provide a MAC header of a fixed size or length. Since some fields of the MAC header could be of a variable length, a MAC header extension is used to handle the variable part of the MAC header. The variable part of the MAC header is isolated in the MAC header extension, and the length information or the size indication of the variable part is used in determining the CRC for the variable part of the MAC header.

More specifically, the non-extended portion, the MAC header, which is the portion of the data packet that is free from possibility of a variable size, is processed quite efficiently. In particular, computing the CRC for the PHY and MAC headers, both being of fixed lengths, is very efficient. For the MAC header extension which is of a variable length, a separate CRC is computed and the computation is facilitated by providing a size indication of the MAC header extension. The separate CRC computation enhances the reliability of the transmission of the MAC header extension in addition to maintaining the computing speed.

Figure 4:
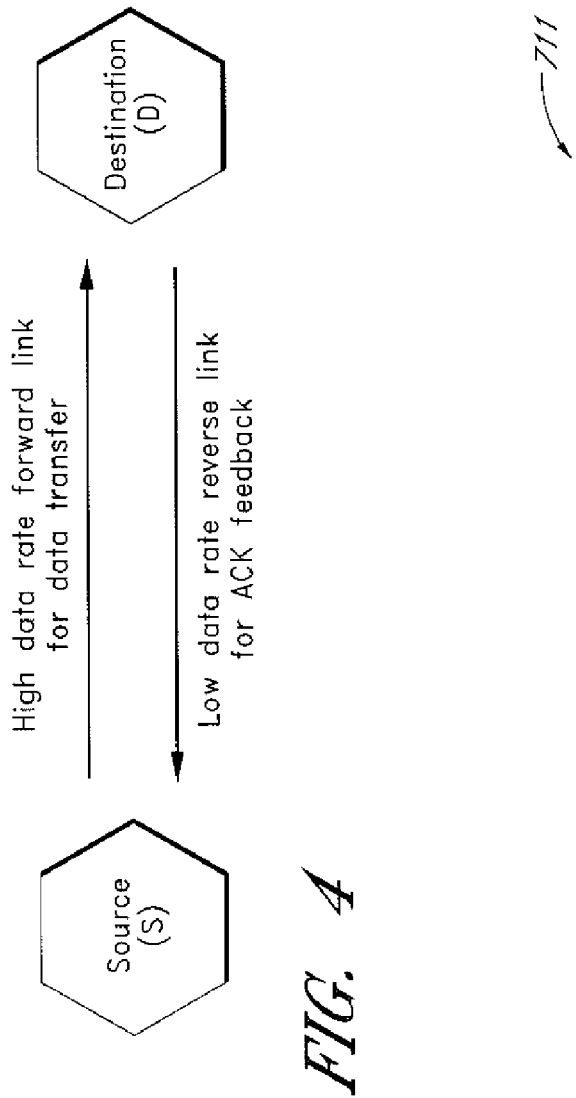
FIG. 4 is a diagram illustrating a file transfer scenario between a source and a destination.

FIG. 4 is a diagram illustrating a file transfer scenario between a source and a destination. Data transfer applications include file transfer, stored multimedia files, etc., where a source device transmits and a destination device receives. As shown in FIG. 4, the source device, S, transmits data over a wireless link to the destination device, D.

Generally, the source device uses a high rate link, which supports a multi-Gbps data rate for transmitting data to the destination device. This high rate link is shown in FIG. 4. The destination device, D, uses a low rate feedback link for transmitting the acknowledgment frame to the source device. In certain embodiments, the reverse link uses the same bandwidth as the high-rate forward link.

There are two approaches in defining the HRP frame format for supporting data transfer: (1) using the existing audio video (A/V) frame format with some modification, and (2) using a new data frame format.

Use Existing A/V Frame Format with Modification

Figure 1:
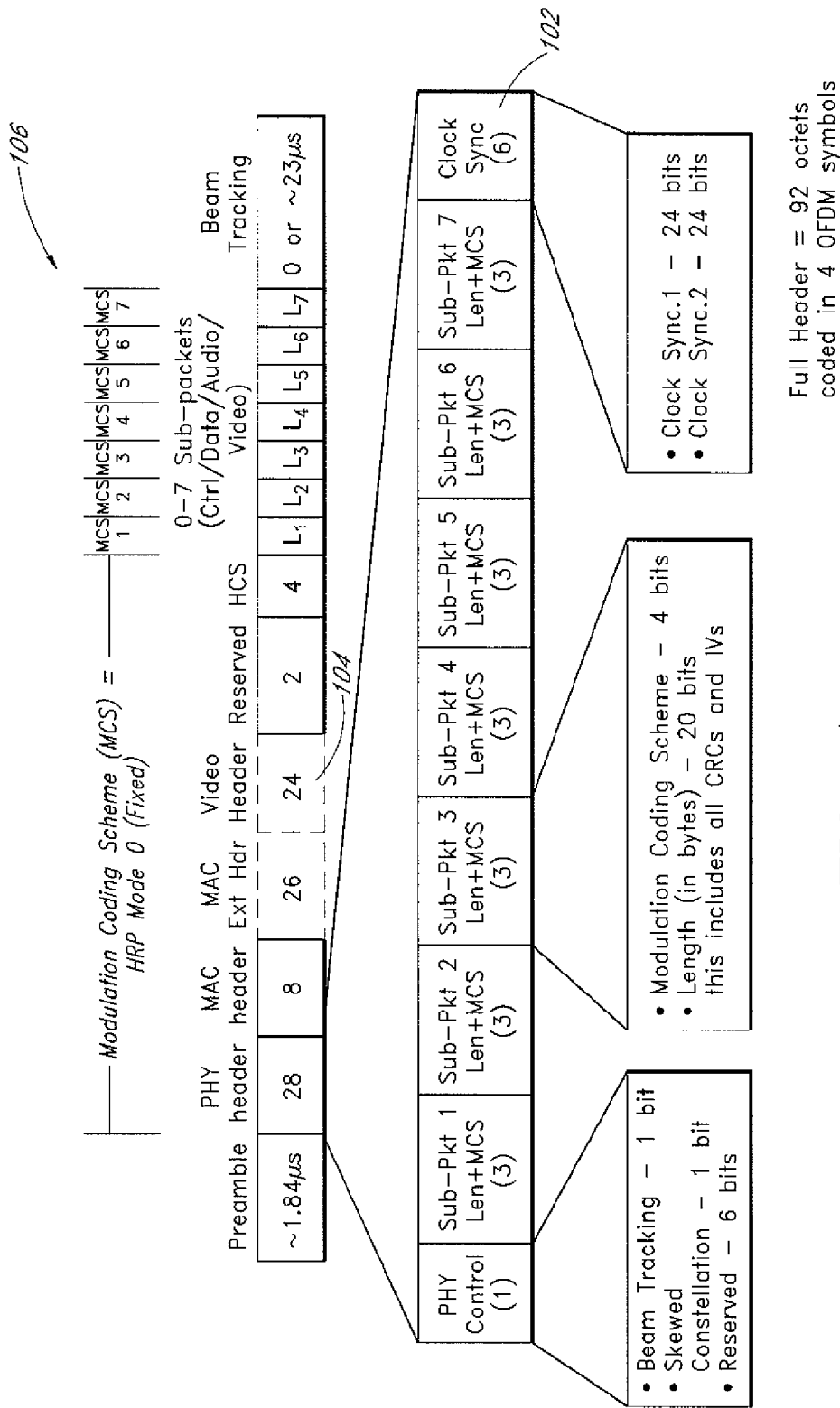
FIG. 1 is a HRP composite frame format for audio video (A/V) applications.

A few fields in an A/V frame format shown in FIG. 1 are redundant for data transfer. Therefore, in a data transfer application, these redundant fields can be ignored for efficiency and speed.

Figure 5:
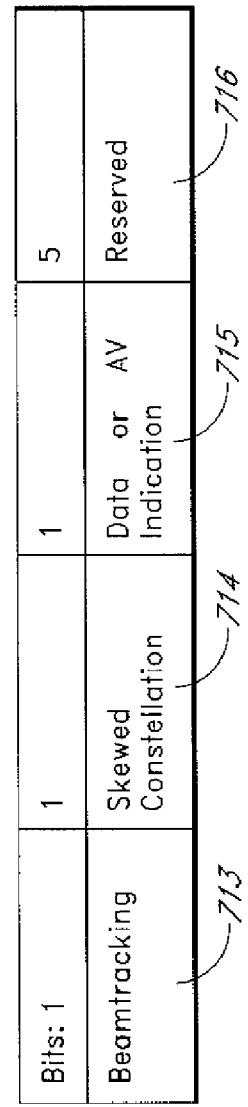
FIG. 5 is a diagram illustrating a PHY control field according to an embodiment of the invention.

FIG. 5 is a diagram illustrating a PHY control field 711 according to an embodiment of the invention. In this embodiment of the invention, one bit from the six reserved bits in the PHY control field 711 is assigned and used to differentiate between an A/V transfer and a data transfer. If the bit 715 indicates the presence of data, then a Video Header field 104 and a Clock Sync field 102 in FIG. 1 can be ignored. Moreover, since audio and video are not included, the number of sub-packet fragments 106 may be reduced from seven to five.

The PHY control field 711 comprises sub-fields for a beamtracking 713, a skewed constellation 714, a data or A/V indication 715, and a reserved space 716 as shown in FIG. 5. The sub-fields and the order of the sub-fields are not critical, and may depend on specific applications and embodiments. The fields may be rearranged. However, the essence of the field does not change. In this embodiment, the data or A/V indication field 715 has been added to the PHY control field 711 of the original PHY frame shown in FIG. 1.

Figure 6:
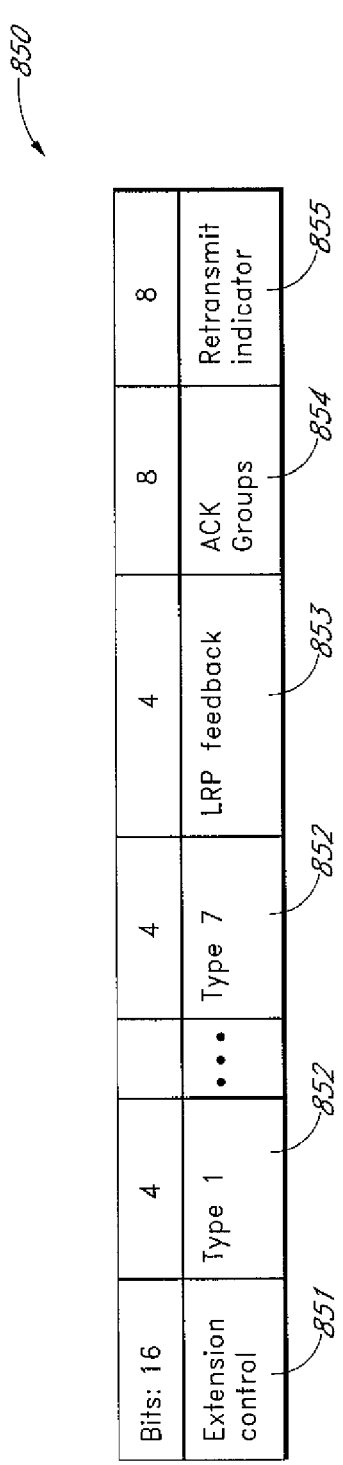
FIG. 6 is a diagram illustrating a MAC header extension format.

For data transfer, the freed fields, i.e., those fields that are no longer associated with a specific purpose and usable for data transfer include the video header (24 bytes) 104, the Clock Sync (6 bytes) 102, and two (6 bytes) of the sub-packet fields 106. The freed space may be used as a retransmit indicator field 855, which is added to the MAC header extension 850 as shown in FIG. 6. The MAC header extension 850 may comprise fields for an extension control 851, types 852 for the sub-packets, a LRP feedback 853, a plurality of ACK groups 854, and the retransmit indicator 855. The retransmit indicator 855 may comprise sub-fields 856 for the sub-packets and a reserved space 857.

Figure 7:
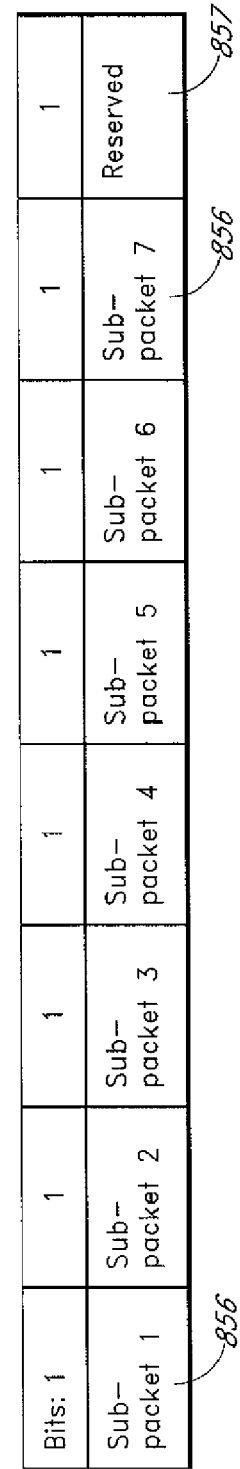
FIG. 7 is a diagram illustrating a retransmit indicator field format in FIG. 6.

The retransmit indicator 855 may be formatted as shown in FIG. 7. The bit for a sub-packet may be set to 1 if the sub-packet is retransmitted. Otherwise, the bit for a sub-packet is set to 0.

Now referring to FIG. 8, the sub-packet field 856 comprises sub-fields for an initialization vector 857, a sub-packet payload 858, a LSB CRC 859, and MSB CRC 860. The sub-packet payload 858 in the sub-packet 856 of FIG. 8 may be formatted as in FIG. 9 when the data or A/V indication field 715 of the PHY control field 711 is set to indicate a data transfer. The sub-packet payload 858 comprises sub-sub-fields for a plurality of payloads 861. In this way, two levels of aggregation at the sub-packet level and the payload level are achieved. Sub-packets with different settings (i.e., beacon, data, and MAC control frames) in the MAC control field can be aggregated together in one MAC frame. Furthermore, each sub-packet may have multiple payloads. Since typical size of the sub-packet is 100K~200K bits, multiple payloads of 40~1500 bytes of IP packets can be aggregated into one payload. Alternatively, a payload larger than the size of the sub-packet, for example, IP packet of 65536 bytes, can be fragmented across multiple sub-packets and included into multiple sub-packets. Therefore, a sub-packet from the payload can be further sub-grouped into sub-sub-packets. In certain embodiments, the data or A/V indication field 715 of the PHY control field 711 includes a bit.

Each of the plurality of payloads 861 may be formatted as in FIG. 10, which includes fields for a length 862, a sequence number 863, a fragment control 864, a CRC 865, and a MAC service data unit (MSDU) 866. An MSDU may include multiple data frames, which is received by the MAC and then either fragmented or concatenated with other recently received MSDUs to form an MPDU. Length field 862 indicates the length of MSDU 866 in octets. The sequence number field 863 is modulo of 2^14. The fragment control field 864 is formatted as 00 (complete MSDU), 01 (first fragment of the MSDU), 10 (middle fragment of the MSDU), and 11 (last fragment of the MSDU). The CRC field 865 is computed over the payload header 867.

Alternatively, a known sequence pattern may be added to the payload header to overcome the case of CRC error in the payload header such that the payloads can be extracted based on the known sequence pattern. This known sequence pattern may be similar to the pattern used in A-MPDU in IEEE 802.11n.

Use a New Data Frame Format

Figure 11:
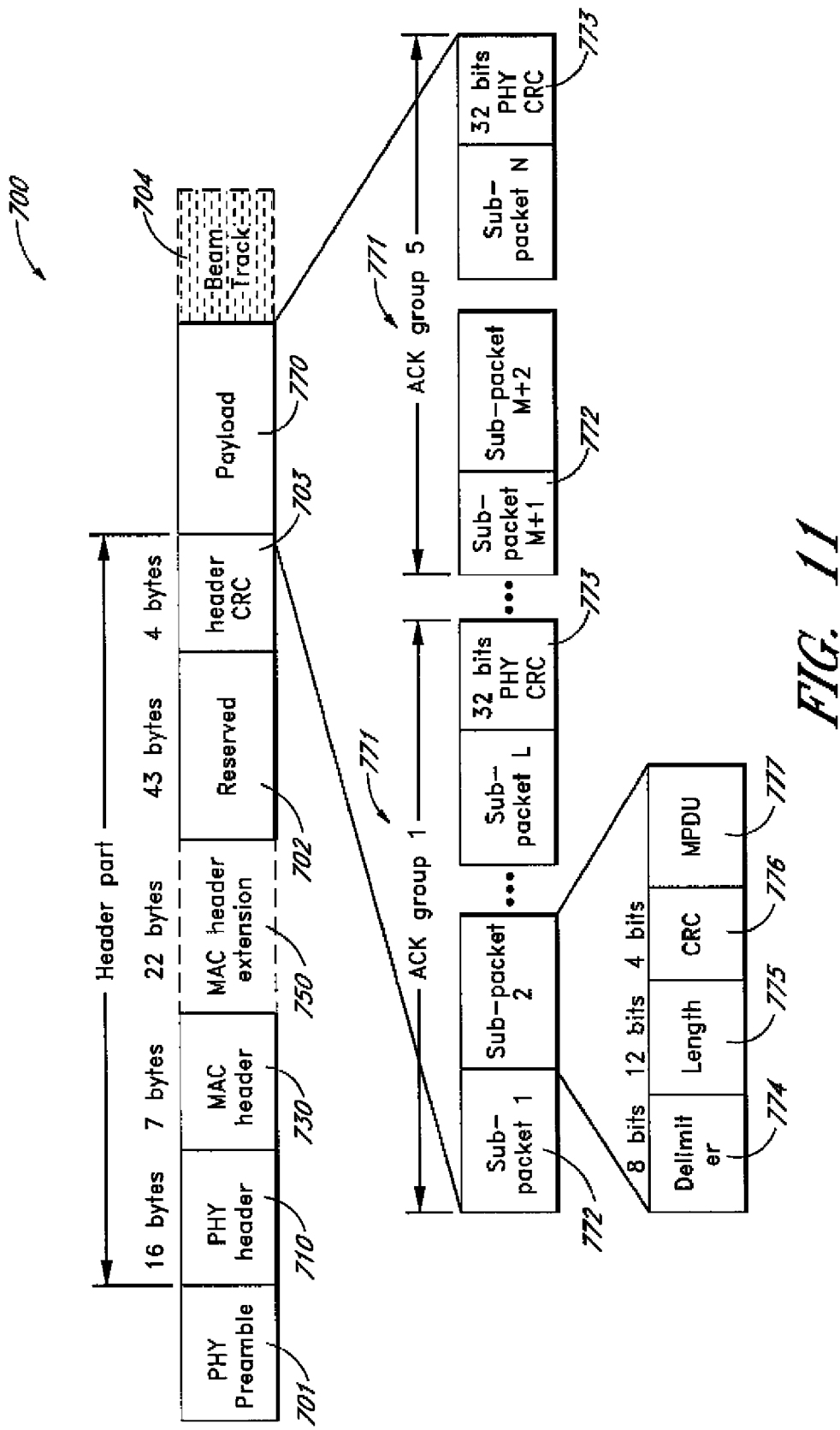
FIG. 11 is a diagram illustrating a HRP frame format for data.
Figure 12:
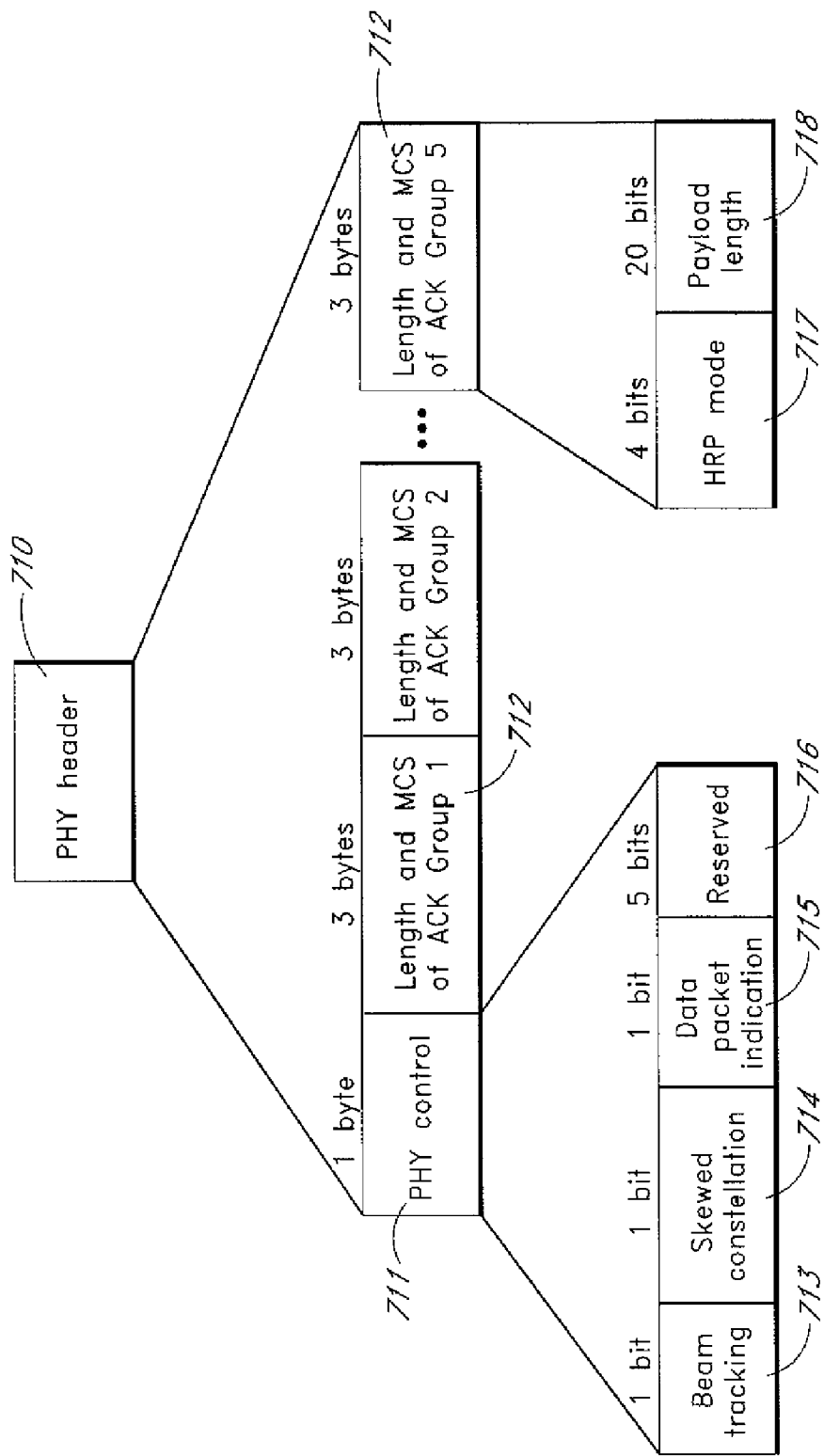
FIG. 12 is a diagram illustrating a PHY header for data in FIG. 11.

FIG. 11 is a diagram illustrating a HRP frame format 700 for data, and FIG. 12 is a diagram illustrating a PHY header 710 for use with the header part shown in FIG. 11.

Referring to FIG. 12, in the PHY header, first of all, one data packet indication field 715 of the PHY control field 711 indicates whether it is a data frame or an A/V frame to transfer. For HRP data transmission, the data packet indication field 715 is set to 1. If this field indicates the presence of data, then the Video Header field 104 and the Clock Sync field 102 in the A/V frame format shown in FIG. 1 are ignored. Second, instead of using the 7 sub-packet length and MCS fields 106 as shown in FIG. 1, the method directly uses 5 ACK groups since the short ACK has 5 ACK bits as shown in FIGS. 11 and 12, where five sub-packet length and MCS fields 712 are used instead of seven. The ACK group length information in 712 of the PHY header 710 is used to indicate the length of each ACK group. If the PHY CRC 773 is successful, then the CRC 776 does not have to be computed. In certain embodiments, the data or A/V indication field 715 of the PHY control field 711 includes a bit.

Referring again to FIG. 11, in the HRP payload 770, there can be multiple sub-packets 772. These sub-packets 772 are grouped into five ACK groups 771. Each ACK group 771 can have one or multiple sub-packets 772. And each ACK group 771 is appended by a 4-byte CRC 773. The CRC 773 is handled at the HRP PHY layer for setting one ACK bit. With this scheme the PHY layer at the receiver doesn't need to analyze each sub-packet before it feeds back the short ACK packet. Therefore, the inter-frame duration between a data frame and the short ACK can be reduced. Length information given in 712 for each ACK group 771 is defined in the PHY header 710. If some bits in an ACK group 771 detected by ACK group CRC 773 are wrong, the corresponding ACK bit will be set to 0. The transmitter will re-send all sub-packets 772 in the ACK group 771. However, at the MAC layer of the receiver side, since each sub-packet has its own CRC check, the MAC layer can know which sub-packets are correct. The PHY layer moves all sub-packets 772 in an ACK group 771 to the MAC layer even though ACK group CRC 773 reports errors for the ACK group 771. With this scheme, from multiple copies of each sub-packets 772 within one ACK group 771, the MAC layer can selectively pick those sub-packets 772 whose own CRCs 773 are correct.

The duration of each ACK group 771 can have a fixed duration if the PHY design has such limitation. For example, PHY may require each ACK group 772 to be 50 μsec long in one example. In this case, null data may need to be appended to the end of the last sub-packet in an ACK group 771 if sub-packets 772 from upper layer have variable sizes.

Each sub-packet 772 begins with an 8-bit delimiter 774, a 12 bit length information 775, a 4-bit CRC 776, and an MPDU 777. The MPDU 777 comprises a MAC header, the MAC header extension if there are security or link adaptation header information, and a MAC payload (MSDU or A-MSDU) information field. The Delimiter 774 may be set to a specific pattern, for example, ASCII code N as used in A-MPDU in IEEE 802.11n.

Referring to FIG. 11, the HRP frame format 700 may further comprise a PHY preamble 701 and a beam track 704. In another embodiment, the beam track 704 may not be provided separately since a part of the payload 770 can be used as a beam track.

Figure 13:
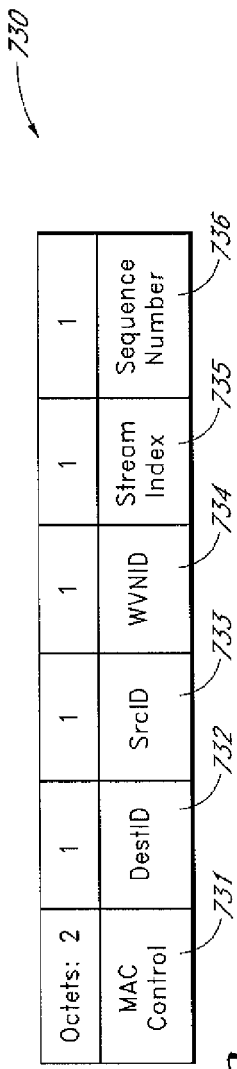
FIG. 13 is a diagram illustrating a MAC header according to an embodiment of the invention.
Figure 14:
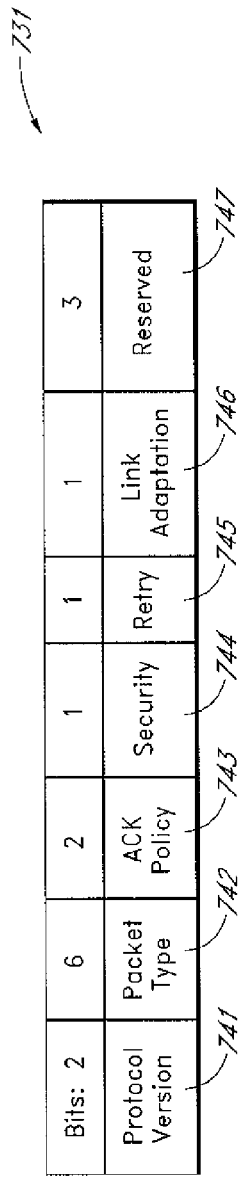
FIG. 14 is a diagram illustrating a MAC control field in FIG. 13.
Figure 15:
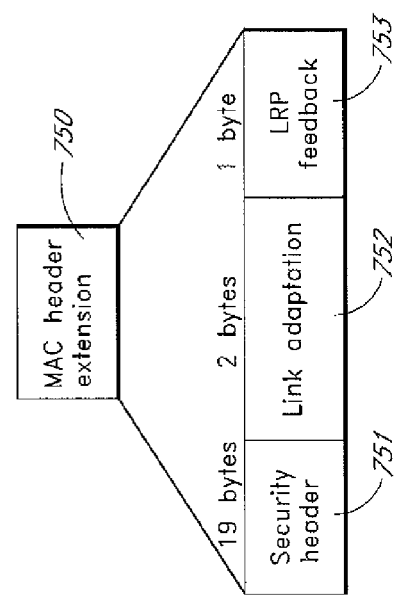
FIG. 15 is a diagram illustrating a MAC header extension format.

FIGS. 13 through 15 show the MAC header 730 and the MAC header extension 750 shown in FIG. 11. FIG. 13 is a diagram illustrating a MAC header according to an embodiment of the invention; FIG. 14 is a diagram illustrating a MAC control field in FIG. 13; and FIG. 15 is a diagram illustrating a MAC header extension format.

The format of the MAC header 730 of FIG. 11 is illustrated in FIG. 13. The MAC header 730 comprises fields for MAC control 731, destination ID 732, source ID 733, wireless video area network ID (WVNID) 734, stream index 735, and sequence number 736. The MAC control field 731 is illustrated in FIG. 14. The MAC control field 731 comprises sub-fields for protocol version 741, packet type 742, ACK policy 743, security 744, retry 745, link adaptation 746, and reserved space 747.

Compared to a MAC header for a HRP composite frame format for A/V applications in FIG. 1, the MAC header extension field 750 was removed and the 3 bits in the original MAC header extension field to the MAC control field 731 as shown in FIG. 14. If the indication bit of security 744 or the link adaptation bit 746 is set to 1, the corresponding fields 751, 752 will be added to the MAC header extension part 750 after the MAC header 730 as shown in FIG. 15. The MAC header extension 750 comprises fields for a security header 751, a link adaptation 752, and an LRP feedback 753.

In FIG. 11, each sub-packet 772 has its own MAC header in the MPDU 777 as discussed above. This scheme allows sub-packets 772 with different settings in the MAC control field 731 to be aggregated together. For example, different kinds of packets such as beacon, data, and MAC control frames can be aggregated together. Also re-transmitted packets and originally retransmitted packets can also be aggregated. In addition, this scheme improves the transmission reliability. Errors in one MAC header will not affect other sub-packets.

Figure 16:
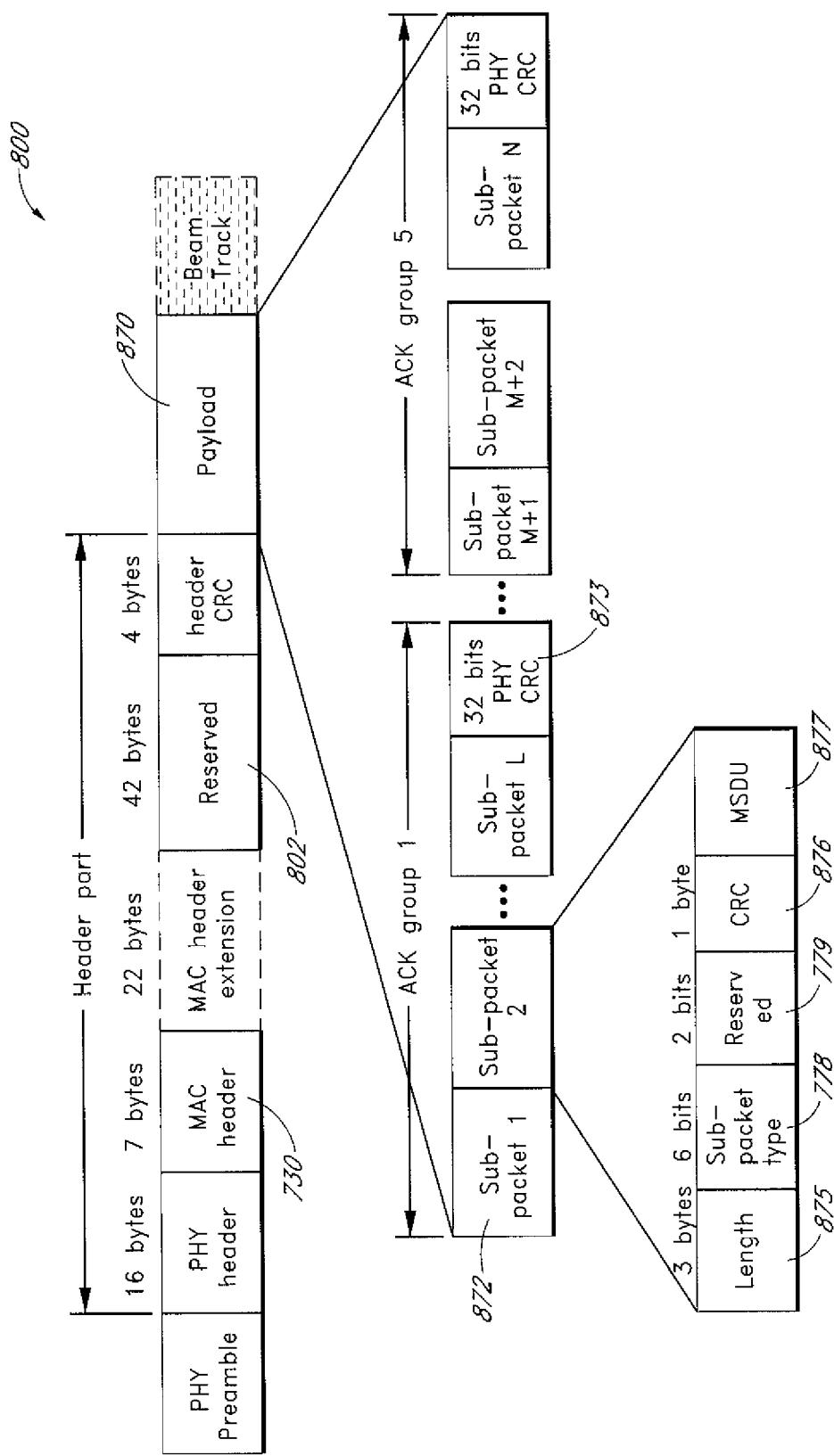
FIG. 16 is a diagram illustrating a HRP frame format for data according to an embodiment of the invention.

FIG. 16 is a diagram illustrating a HRP frame format for data according to an embodiment of the invention. FIG. 16 illustrates an alternative HRP frame format 800 for data in which all sub-packets 872 share one MAC header 730. The advantage of this approach is that the MAC header overhead is minimized since all sub-packets 872 share one MAC header 730. However, sub-packets with different MAC control configurations cannot be aggregated together. Each sub-packet 872 comprises an 8-bit delimiter (not shown), a 12-bit length information 875, a 6-bit sub-packet type information 778, 2 reserved bits 779, and a 4-bit CRC 876. The PHY header, the MAC header and MAC control are the same as illustrated in FIG. 12, FIG. 13, and FIG. 14, respectively.

One byte from the reserved 42 bytes 802 is used to indicate the retransmission status of each sub-packet. This one byte field is called as retransmission indicator 855 as shown in FIG. 6.

In both of the new frame formats discussed above, there are a number of unused header bytes, which can be used as follows: since the A/V frame format of FIG. 1 requires 4 OFDM symbols, a data specific PHY and MAC headers can be designed which fits into 3 OFDM symbols (69 bytes); if 4 OFDM symbols are necessary owing to PHY design constraint, the following options are available; since the HCS computation skips the free fields, a bit error occurring in the free fields will not trigger CRC failure, which eliminates the probability of false-positive; the free fields can be used for defining sequence numbers and retransmission count for the five sub-packets; and some higher layer protocol information can be provided in these free fields, or to put some small control message such as AVC message.

Although embodiments of the invention have been described for use in a particular wireless HD video network, the HRP frame structure is not so limited. Embodiments can be used in general with other MAC protocols in wireless video network environment.

Figure 17:
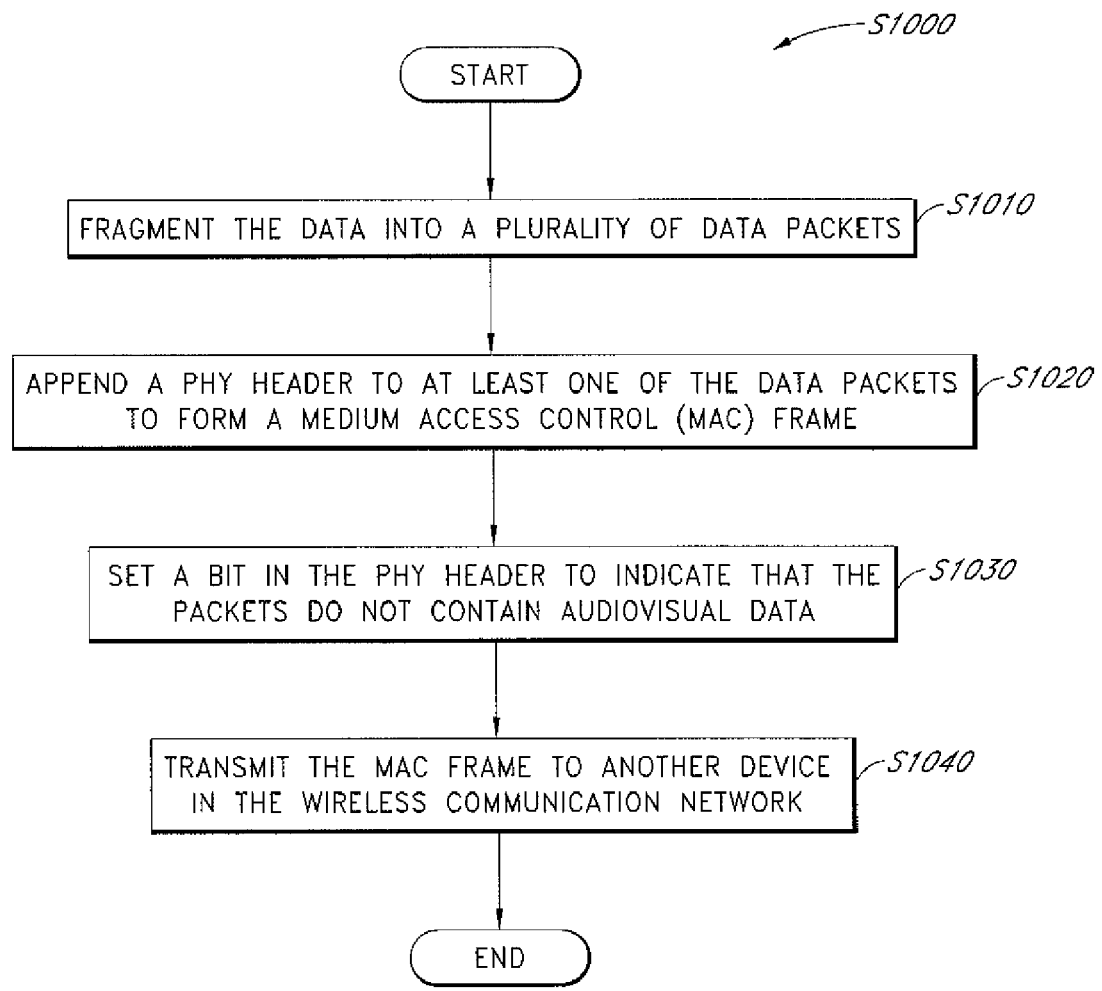
FIG. 17 is a flowchart showing a method of transferring data in a wireless communication network for uncompressed video.

FIG. 17 is a flowchart showing a method of transferring data in a wireless communication network for uncompressed video. The method (S1000) comprises fragmenting the data into a plurality of data packets (S1010); appending a PHY header to at least one of the data packets to form a medium access control (MAC) frame (S1020); setting a bit in the PHY header to indicate that the packets do not contain audio video (A/V) data (S1030); and transmitting the MAC frame to another device in the wireless communication network (S1040). In fragmenting (S1010), alternatively, small payloads can be aggregated into one sub-packet as discussed above.

By using existing A/V frame format with modification of including a field to indicate that the packets do not contain audio video (A/V) data or using a new data frame format including a data packet indication field of the PHY control field as described above, the channel efficiency in a time insensitive data transfer such as file transfer in high data rate wireless networks can be significantly enhanced. The reduction in data transfer time results in a longer battery life in battery operated devices.

CONCLUSION

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of transferring data in a wireless communication network for uncompressed video, the method comprising:
   fragmenting the data into a plurality of data packets;
   fragmenting at least one of the data packets into a predetermined number of sub-packets, wherein the predetermined number of sub-packets is reduced when the sub-packets do not include audio video (A/V) data;
   appending a physical (PHY) header to at least one of the data packets to form a medium access control (MAC) frame;
   adding an A/V indication field in the PHY header;
   setting the added A/V indication field in the PHY header to indicate whether the packets contain A/V data; and
   transmitting the MAC frame from a first device to a second device in the wireless communication network,
   wherein the predetermined number of sub-packets are same as a number of acknowledgment (ACK) groups in the second device.

2. The method of claim 1, wherein after the data has been transmitted, the first device transmitting to one of the second device and a third device, packetized uncompressed video with a subsequent MAC frame and setting a field of a PHY header of the subsequent MAC frame to indicate AN data is being transferred.

3. The method of claim 1, wherein a PHY layer in the second device does not apply an acknowledgment group mapping for mapping the sub-packets to the ACK groups.

4. The method of claim 3, wherein each ACK group is appended by a cyclic redundancy checksum (CRC), wherein the CRC is handled by the PHY layer of the second device.

5. The method of claim 4, wherein the first device functions as a transmitter side and the second device functions as a receiver side, and wherein all the sub-packets in an ACK group are moved to a MAC layer in the receiver side by a PHY layer of the receiver side.

6. The method of claim 5, wherein in the second device, the MAC layer selectively selects sub-packets whose own CRCs are correct.

7. The method of claim 1, wherein the PHY header further comprises a retransmission indicator field configured to indicate the retransmission status of each sub-packet.

8. The method of claim 1, further comprising the first device appending a MAC header to at least one of the data packets to form the MAC frame.

9. The method of claim 8, wherein each of the sub-packets comprises a MAC header such that errors in one MAC header do not affect other sub-packets.

10. The method of claim 8, wherein the sub-packets share one MAC header.

11. The method of claim 1, wherein the AN data comprise video, audio, and control information.

12. The method of claim 1, wherein the MAC frame comprises a MAC header and a header cyclic redundancy checksum (CRC) for the PHY header and the MAC header.

13. The method of claim 1, wherein each of the plurality of data packets comprises a sub-packet, and wherein each sub-packet comprises a plurality of small payloads.

14. The method of claim 13, wherein each of the small payloads comprises a sub-sub-packet.

15. The method of claim 13, wherein each of the small payloads comprises a payload header comprising fields for length, sequence number, fragment control, cyclic redundancy checksum (CRC), and MAC service data unit (MSDU).

16. The method of claim 13, wherein each of the small payloads comprises a known sequence pattern.

17. The method of claim 1, wherein the PHY and MAC headers are designed to fit into 3 orthogonal frequency division multiplexing (OFDM) symbols.

18. The method of claim 1, further comprising if the A/V indication field in the PHY header indicates that the packets do not contain A/V data, then ignoring processing for particular fields in the MAC frame.

19. The method of claim 18, wherein the particular fields comprising a video header field and a clock synchronization field.

20. A system for transferring data in a wireless communication network for uncompressed video, the system comprising:
   a receiver configured to receive data;
   a controller configured to:
      fragment the data into a plurality of data packets;
      fragment at least one of the data packets into a predetermined number of sub-packets, wherein the predetermined number of sub-packets is reduced when the sub-packets do not contain audio video (A/V) data;
      append a physical (PHY) header to at least one of the data packets to form a medium access control (MAC) frame; and
   a transmitter configured to transmit the MAC frame to the receiver,
   wherein the predetermined number of sub-packets are same as a number of acknowledgment (ACK) groups in the receiver.

21. The system of claim 20, wherein the transmitter is configured to transmit a subsequent MAC frame to the receiver after the data has been transmitted, wherein the MAC frame contains uncompressed video and wherein a field of the subsequent MAC frame is set to indicate A/V data is being transferred.

22. The system of claim 20, further comprising a detector configured to detect whether the data contains A/V data and wherein the controller sets the field in the PHY header of the MAC frame according to a signal from the detector.

23. The system of claim 20, wherein a PHY layer in the receiver does not apply an acknowledgment group mapping for mapping the sub-packets to the ACK groups.

24. A system for transferring data in a wireless communication network for uncompressed video, the system comprising:
   a controller configured for:
      fragmenting the data into a plurality of data packets;
      fragmenting at least one of the data packets into a predetermined number of sub-packets, wherein the predetermined number of sub-packets is reduced when the sub-packets do not contain audio video (AN) data;

appending a physical (PHY) header to at least one of the data packets to form a medium access control (MAC) frame; and a transmitter configured for transmitting the MAC frame to a device in the wireless communication network, wherein the predetermined number of sub-packets are same as a number of acknowledgment (ACK) groups in the device.

25. The system of claim 24, wherein the field in the PHY header comprises a bit.

26. The system of claim 24, wherein the system is configured to transfer delay-insensitive data to the device.

27. The system of claim 24, wherein a PHY layer in the device does not apply an acknowledgment group mapping for mapping the sub-packets to the ACK groups.

28. A method of transferring data in a wireless communication network for uncompressed video, the method comprising:

fragmenting the data into a plurality of data packets;

fragmenting at least one of the data packets into a predetermined number of sub-packets;

appending a PHY header to at least one of the data packets to form a medium access control (MAC) frame; and wirelessly transmitting the MAC frame from a transmitter device to a receiver device in the wireless communication network, wherein the predetermined number of sub-packets are same as a number of acknowledgment (ACK) groups in the receiver device such that a physical PHY layer in the receiver device does not apply an acknowledgment group mapping for mapping the sub-packets to the ACK groups.

29. A method of transferring data in a wireless communication network for uncompressed video, the method comprising:

fragmenting the data into a plurality of data packets;

fragmenting at least one of the data packets into a predetermined number of sub-packets, wherein the predetermined number of sub-packets is reduced when the sub-packets do not include audio video (A/V) data;

appending a physical (PHY) header to at least one of the data packets to form a medium access control (MAC) frame;

setting a field in the PHY header to indicate whether the packets contain A/V data; and transmitting the MAC frame from a first device to a second device in the wireless communication network, wherein the predetermined number of sub-packets are same as a number of acknowledgment (ACK) groups in the second device such that a PHY layer in the second device does not apply an acknowledgment group mapping for mapping the sub-packets to the ACK groups.

* * * * *